Patented Apr. 12, 1932

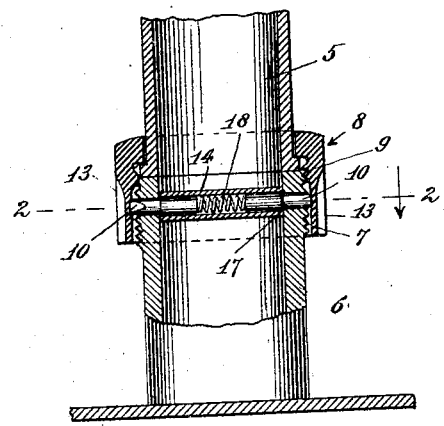
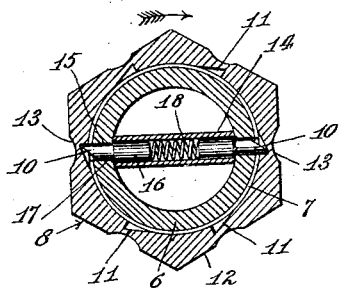
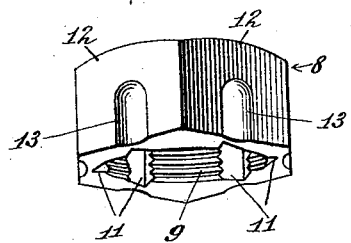

1,854,048

UNITED STATES PATENT OFFICE

JOHN J. LAUSTER, OF NEW YORK, N. Y., ASSIGNOR TO GEORGE T. RITCHINGS, OF MAPLEWOOD, NEW JERSEY

NONREUSEABLE COUPLING

Application filed July 23, 1930. Serial No. 470,169.

This invention relates to couplings and broadly comprehends a coupling which is so constructed that after its initial emplacement, a reuse thereof is positively precluded.

The invention contemplates an improved coupling or union which, while not necessarily restricted to such use, is primarily devised for the connection of a fluid supply line to a meter for the purpose of preventing unauthorized disconnection of the supply line from the meter and reconnection of the same therewith without detection.

More specifically the invention resides in the provision of a union or coupling which may be initially emplaced to couple the parts, which coupling or union is constructed in such a manner and cooperates with one of said parts so as to prevent displacement without destruction of the union or coupling, it being understood that replacement couplings may be secured only from an authorized source.

Other objects of the invention reside in the comparative simplicity of the construction of the coupling or union, the economy with which it may be produced and the general efficiency derived therefrom.

With the above recited and other objects in view, reference is had to the following specification and accompanying drawings in which there is illustrated one embodiment of the invention, while the claims define the actual scope thereof.

In the drawings:

Figure 1 is a longitudinal sectional view through a coupling or union constructed in accordance with the invention.

Figure 2 is a transverse sectional view thereof taken approximately on the line 2—2 of Figure 1.

Figure 3 is a perspective view of the coupling element removed.

Referring to the drawings by characters of reference, 5 and 6 designate respectively a pair of conduit sections, the latter being externally threaded as at 7 and the former having swiveled thereon a coupling element or union 8 which is internally threaded as at 9 to threadedly engage over the externally threaded portion 7 of the conduit section 6 upon turning movement thereof in one direction.

Suitable interengaging means is provided on the conduit section 6 and the coupling 8 which permits of free turning movement of the union or coupling element 8 in the direction to couple the sections 5 and 6 together while obstructing or preventing turning movement of the element 8 in the opposite direction to uncouple or disconnect the sections 5 and 6.

Preferably the means consist of one or more ratchet pawls 10 carried by and normally projecting from the threaded conduit section 6 and engageable with ratchet grooves 11 extending axially of the internally threaded portion 9 and spaced circumferentially. The coupling element or union 8 is formed with external wrench or tool engaging surfaces 12 having cut-away or weakened portions 13 at a point adjacent the ratchet grooves 11 so that upon the application of a sufficient force to turn the element or union 8 in a direction to uncouple the sections 5 and 6, the element or union 8 will be fractured and rendered unfit for reuse.

Obviously, various ways of mounting and assembling the ratchet pawls 10 may be employed but for the purpose of illustration a tube section 14 has been shown which is arranged diametrically within the threaded conduit section 6 to axially align with diametrically disposed openings 15 which are of a lesser diameter than the interior diameter of the tube section 14. The ratchet pawls 10 are designed to snugly fit the openings 15 and are provided with enlarged inner ends 16 which snugly fit within the tube section 14 thereby providing a stop shoulder 17 which limits the outward movement of the ratchet pawls under the influence of a coiled expansion spring 18 arranged in the tube and interposed within the enlarged inner ends 16 of the pawls.

In use of the device it is apparent that coupling of the conduit 5 with the conduit 6 is accomplished by turning the element or union 8 in a clockwise direction as indicated by the arrow in Figure 2, thereby screwing said element or union 8 onto the threaded end 7 of the conduit 6. The ratchet grooves will freely ratchet over and cam the ratchet pawls 10 inwardly until the connection is established. Any attempt to turn the union or element 8 in a counterclockwise direction will result in fracturing of the element or union 8 at the weakened portions 13 if sufficient force is exerted.

It is, therefore, obvious that in use of the device for connecting a fluid supply line to a meter attempts to disconnect and reconnect the supply line and meter for fraudulent purposes will be readily detected in view of the fact that unauthorized persons cannot secure a new union or coupling element 8 to replace the one which is fractured.

While there has been illustrated and described a single and preferred embodiment of the invention, it is to be clearly understood that no limitation is intended to the precise structural details and that variations and modifications thereof, which properly fall within the scope of the appended claims, may be resorted to when desired.

I claim:

1. The combination with a pair of conduit sections, of non-reuseable coupling element therefor, carried by one of the sections and movable in one direction relative to the other section for effecting coupling of said sections, said element and latter section having interengaging means for fracturing the coupling element upon relative movement in the other direction.

2. In combination, a pair of mating communicating fluid conduit sections, a union carried by and swiveled on one of the conduit sections and threadedly engaging the other conduit section and interengaging means on said union and the latter conduit section for fracturing said union upon retrograde turning movement thereof for the purpose of disconnecting the conduit sections.

3. In combination, a pair of mating communicating fluid conduit sections, a union carried by and swiveled on one of the conduit sections and threadedly engaging the other conduit section and interengaging means on said union and the latter conduit section for fracturing said union upon retrograde turning movement thereof for the purpose of disconnecting the conduit sections, said means including a ratchet pawl carried by and normally projecting from the threaded conduit section and ratchet grooved portions on the union cooperating with the pawl to permit of free turning movement of the union to thread onto the threaded conduit section.

4. In combination, a pair of mating communicating fluid conduit sections, a union carried by and swiveled on one of the conduit sections and threadedly engaging the other conduit section and interengaging means on said union and the latter conduit section for fracturing said union upon retrograde turning movement thereof for the purpose of disconnecting the conduit sections, said means including a ratchet pawl carried by and normally projecting from the threaded conduit section and ratchet grooved portions on the union cooperating with the pawl to permit of free turning movement of the union to thread unto the threaded conduit section and weakened portions of said union.

5. In combination, a pair of mating communicating fluid conduit sections, a union carried by and swiveled on one of the conduit sections and threadedly engaging the other conduit section and interengaging means on said union and the latter conduit section for fracturing said union upon retrograde turning movement thereof for the purpose of disconnecting the conduit sections, said means including a ratchet pawl carried by and normally projecting from the threaded conduit section and ratchet grooved portions on the union cooperating with the pawl to permit of free turning movement of the union to thread onto the threaded conduit section and weakened portions of said union disposed adjacent the ratchet grooved portions thereof.

6. In combination, an externally threaded conduit, a second conduit communicating therewith, an internally threaded coupling element swiveled on the second conduit and threadedly engaging the first to connect said conduits, said coupling element and first conduit having coacting means for effecting the fracturing of the former upon disconnection of the conduits.

7. A non-reuseable coupling having weakened portions adapted to be fractured upon uncoupling thereof, and means adapted to cooperate with one of a plurality of elements to be coupled for causing fracturing of said coupling upon relative movement thereof with reference to said element when attempting to uncouple the same.

8. The combination with a pair of members to be coupled, of a non-reuseable coupling movable in one direction with reference to said members to effect coupling thereof, said coupling element and one of said sections having cooperative means for fracturing the coupling element upon relative movement in an opposite direction.

Signed at Jamaica, N. Y., in the county of Queens and State of New York, this 21st day of July, 1930.

JOHN J. LAUSTER.